Dec. 1, 1964   F. RUDOLPH   3,159,146
WATER-COOLED SUSPENSION OF STEAM PRODUCERS
Filed Aug. 11, 1961   6 Sheets-Sheet 3

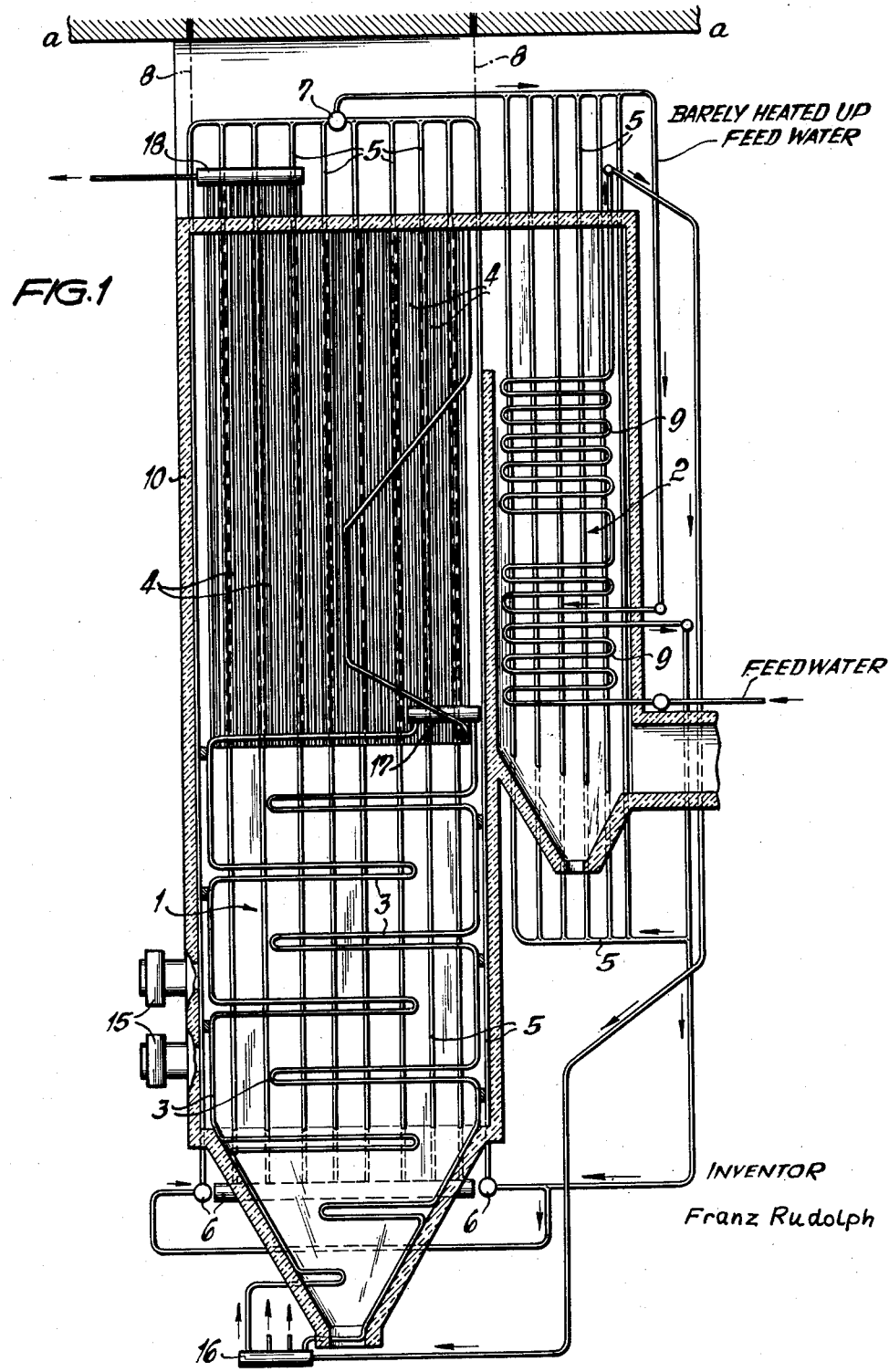

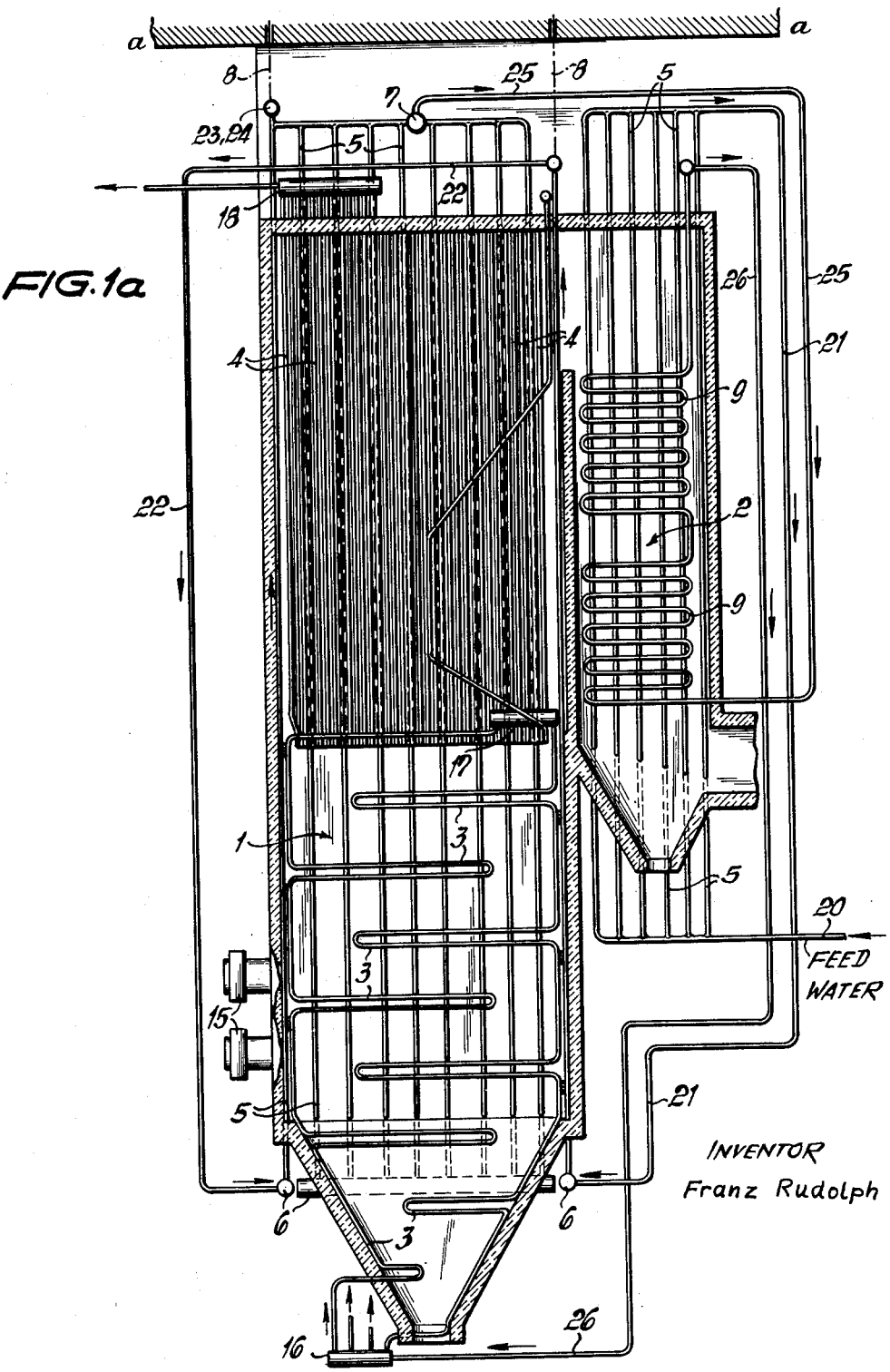

INVENTOR
Franz Rudolph

INVENTOR
Franz Rudolph

INVENTOR
Franz Rudolph

United States Patent Office 3,159,146
Patented Dec. 1, 1964

3,159,146
WATER-COOLED SUSPENSION OF STEAM
PRODUCERS
Franz Rudolph, Gummersbach, Rhineland, Germany, assignor to L. & C. Steinmuller G.m.b.H., Gummersbach, Rhineland, Germany
Filed Aug. 11, 1961, Ser. No. 130,823
Claims priority, application Germany, Aug. 19, 1960,
St 16,825
2 Claims. (Cl. 122—510)

The present invention relates to a suspension of steam producers on water-cooled suspension means, especially suspension pipes.

With modern boiler installations, the surrounding walls including the insulation and also including the sheet metal skin are supported by the tubes of the evaporating system or the vertical down flow tubes arranged around the circumference of the boiler, while in most instances the masonry is eliminated.

Frequently the entire boiler, or at least the entire fire box, is suspended either on correspondingly reinforced principal roof trusses of the respective building on an independent framework, or on correspondingly high heavy construction frames. The entire boiler or at least the entire fire box will expand in downward direction corresponding to the temperature of the pressure conducting parts and in conformity with the construction of its outer skin.

Important in this connection is that no movements will occur between the various boiler tubes or coils and the insulation which would impede other movements, because only in this way a proper seal, especially for boilers operated at a high pressure firing, will be assured. With natural circulation boilers, the insulation and the sheet metal skin are connected to the boiling or evaporator tubes and to the vertical down flow tubes. In the area of subsequent heating surfaces, the walls are in most instances likewise suspended on boiling tubes in order in the interest of an overall seal to assure a uniform expansion of the boiler at all levels.

With once through boilers, in contrast thereto, the temperature development is by no means uniform even within the evaporating portion. This applies particularly to non-uniform conditions of operations, i.e. with changes in the load and when starting the boiler or throttling its operation. In portions of the boilers, especially the vertical downflow tubes and connecting tubes of the evaporation system, the temperatures of the working medium are at approximately the same level while still prevailing differences for uniform operation may be compensated, especially by connecting points at different levels of the suspension system. With such a suspension of the boiler parts on the drop and connecting tubes, the designer is, however, no longer able to arrange the various heating surface sections of the boilers according to the proper thermotechnical and flow technical aspects in the fire gas flow. In addition thereto, in once through boilers with critical or super-critical pressure, the quantities of the working medium in the various heating surfaces respectively have different temperatures and therefore, for all practical purposes there are no parts of the installation, even those which absorb only small quantities of heat, which would have a constant temperature over any major length of the tubes. In this instance, the problem involved will be the same which prevails with the so-called air and gas boilers of gas turbine installations and may be solved by corresponding means.

It is, therefore, an object of the present invention to provide a water-cooled suspension of steam producers, which will overcome the above mentioned drawbacks.

It is another object of this invention to provide a water-cooled suspension of the type set forth in the preceding paragraph, in which practically the same expansion will be obtained at all levels so that no relative displacement of different boiler portions in vertical direction will be encountered.

It is still another object of this invention to provide a water-cooled suspension for steam producers, as set forth in the preceding paragraph, which will not affect the heat economy and operational and cost requirements of installations of the type involved.

These and other objects and advantages of the invention will appear more clearly from the following specification in connection with the accompanying drawing, in which:

FIG. 1 is a vertical longitudinal section through a boiler with fire box and subsequent drop flue.

FIG. 1a is a vertical longitudinal section through a boiler slightly modified over that of FIG. 1.

Figure 9:
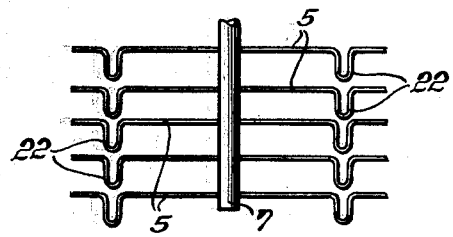
Figure 10:
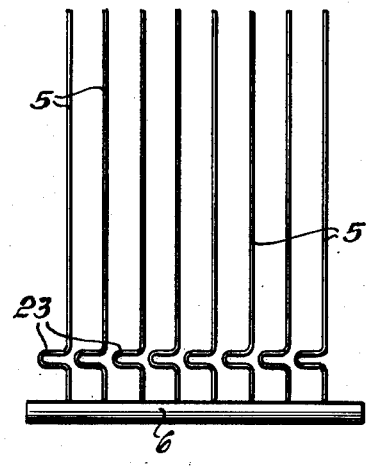

FIGS. 9 and 10 respectively illustrate means for equalizing relative elongations in the supporting tubes of the boiler according to the present invention.

The present invention is characterized primarily in that the entire steam producer is suspended on a greater number of vertical pipes passed through by the feed water and substantially arranged in parallel with regard to the water flow. The feed water which enters the vertical down flow or drop pipes has either not passed through the flue gas heated economizer at all, or has passed through only a small portion thereof in order to make sure that the temperature of the feed water will vary only within minor temperature limits.

Inasmuch as the feed water while passing through the suspension tubes will, in spite of this arrangement behind the water cooled boiler tubes proper, still be heated up by some degrees, an increase in the following heating surfaces, i.e. either of the economizer or the heating preheater cannot be completely avoided. This drawback, however, is only of minor importance over the important advantage obtained for the construction of the entire boiler namely that, if desired, the same expansion will occur at all levels of the boiler so that no relative displacement between different boiler parts will occur in vertical direction. Moreover, in spite of the entire construction, complete freedom will be assured for meeting the heat, economic, operational, and cost requirements.

In connection herewith, the use of coal dust burners and other firing devices, particularly those connected to unelastic air passages, is to be mentioned since for this type of burners, the vertical total displacement will remain in considerably narrower limits than heretofore.

As the suspension pipes are arranged within the surrounding walls, it is advantageous to arrange these suspension pipes between the heat absorbing wall cooling pipes proper on one hand and the insulating layer and the outer sheet metal wall on the other hand in such a way that the two loads are suspended on the suspension tubes by means of different connecting wires.

If desired an inner sheet metal wall may be provided between the wall cooling pipes and the suspension tubes.

The inner sheet metal wall may advantageously be connected in a gas-tight manner to vertical directly adjacent suspension tubes or through the intervention of a plurality of intermediate suspended tubes. This suspension may be such that the strips along their vertical sides are bent inwardly at their respective ends while the free ends of said bent portions which make possible an expansion in transverse direction are for instance welded to the suspension tubes.

The suspension tubes are, of course, arranged in spaced relationship with regard to each other at a spacing of for instance 20 centimeters and may have a relatively narrow clear cross section and a wall thickness corresponding to the respective loads. This will simultaneously furnish the possibility of arranging in parallel with regard to the water flow even a very great number of suspension tubes so that at least their entrance temperature will everywhere be approximately the same. Even with temporary variations in the water entrance temperature as they are encountered for instance when the boiler is to be started with cold water, when the high pressure regenerative economizer is out of order, when operating at constant pressure or for other reasons, the temperatures will in all suspension tubes be identical for all practical purposes. With greater quantities of feed water on the other hand, it would also be possible to arrange in parallel to said pipes bypass tubes of larger cross section which, if desired may have arranged therein adjustable throttle means. In view of the low heat absorption of the suspending pipes, the temperature differences at the entrance into the heating surfaces following said tubes are negligible and may in addition thereto, of course, be equalized or compensated by a mixing accumulator.

It is, of course, to be understood that also horizontal coils in form of meander-shaped bands (serpentine coils) or also vertical straight pipe groups may be suspended.

It is well known that horizontal coils are adapted to absorb heat expansion differences between themselves and the suspension tubes, in view of their own elasticity. In contrast thereto, vertically arranged straight pipe groups are advantageously connected at one end thereof and are guided only at the other end. In some special instances, especially when small boilers with small quantities of feed water and a great number of suspension tubes are involved, it may be economical to sub-divide the parallelly arranged suspension tubes into a plurality of groups of tubes and to arrange these groups in parallel or in series with regard to each other. Such special instances may occur when the suspension tubes, for certain reasons, have to be exposed to increased heating of locally different intensity.

Referring now to the drawing in detail, the boiler shown therein and operated with forced circulation comprises substantially the customary fire box 1 and a drop flue 2 connected thereto. The walls of the lower fire box section are lined with horizontal bands of meander or serpentine-shaped coils 3, whereas the upper fire box section is lined with vertical straight tubes 4. These wall cooling pipes 3, 4 are in customary manner combined to groups to form so-called wall cooling elements which in their turn may be arranged at random with regard to each other.

The suspension tubes 5 extend substantially over the entire height of the steam producer, have their origin at the bottom at distributing chambers 6 and are combined at the top to form collecting chambers 7. The suspension tubes 5 themselves are above the passage ceiling suspended by means of tie-rods 8 and other auxiliary means not shown as for instance by compensating transverse beams, at a—a substantially at a correspondingly reinforced roof truss, and preferably supporting the surrounding walls. However, they may also directly or indirectly support other portions of the boiler. The last mentioned boiler portions comprise for instance the heating surfaces 9 arranged in the drop flue.

Figure 2:
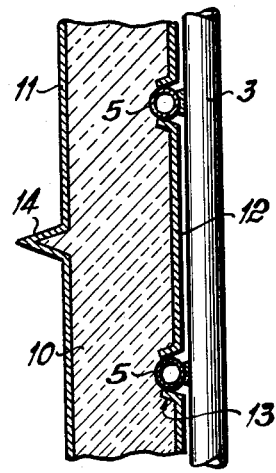
FIG. 2 shows in a horizontal section a possibility of designing the wall with horizontally located wall cooling tubes.
Figure 3:
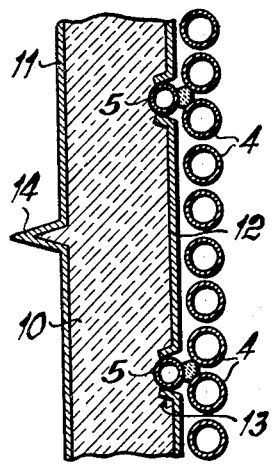
FIG. 3 is a section similar to that of FIG. 2 but shows a wall design with vertically arranged wall cooling pipes.

Particulars of the arrangement of the suspension pipes in the boiler confining walls consist in conformity with FIGS. 2 and 3 in that for instance the insulating layer 10—regardless of the design—and an outer sheet metal skin 11 are arranged on one side of the suspension tubes 5, whereas the pipes 3, 4 of the cooling wall are arranged on the other side of the suspension tubes 5. In addition thereto, an additional inner sheet metal wall 12 has been shown. The inwardly bent edges 13 of the metal strips arranged or suspended vertically and forming said sheet metal wall are as far as possible connected at their outer ends in a gas-tight manner with the suspension tubes 5. This connection may, for instance, be effected by welding. These edges 13 make possible an elastic expansibility of the inner sheet metal wall in horizontal direction similar to the edges 14 of the sheet metal outer skin 11 which, however, similar to the auxiliary means for the expansibility in vertical direction do not form a part of the invention proper.

FIGURE 1a shows the suspension tubes 5 connected in series where feed water enters conduit 20, passes through the supporting tubes for the drop flue 2 and from the upper ends of the supporting tubes, then passes through conduit 21 to the lower distributing box 6 at the back of the fire box. The water flowing upwardly through the supporting tubes that are connected to distributing box 6 now leaves through conduit 22, which extends downwardly to the distributing box 6 for the supporting tubes at the front of the fire box, and the feed water then flows upwardly through these tubes to the conduits 23 and 24 and then to the supporting tubes for the fire box which are located to the right and left sides thereof.

The feed water finally leaves the serially arranged suspension tubes by way of collecting chamber or box 7, and then passes through conduit 25 into an economizer 9. The feed water is preheated in economizer 9 and then passes through conduit 26 to the inlet chamber 16 for the evaporator tubes of the boiler.

The water first passes through the serpentine tubes around the lower portion of the fire box and then enters collection chamber 17, from which it passes into the vertical tubes 4 and finally into a discharge collector 18, from which the steam may pass to a super-heater. Conventional burners 15 are shown for the fire box.

In FIGURE 1 the supporting tubes are shown connected in parallel. The feed water first passes through a part of the economizer and is then distributed over all of the supporting tubes for the drop flue and supporting tubes for the fire box. The supporting tubes for the fire box come together in discharge chamber 7 and a collection conduit leads from chamber 7 to the main portion of the economizer, and this conduit is also connected with the upper ends of the supporting tubes for the drop flue.

The feed water after passing through the main portion of the economizer is now fully preheated and then passes to inlet chamber 16 for the boiler. The remainder of the tubes in the boiler are connected in the same way as described in connection with FIGURE 1a.

Figure 8:
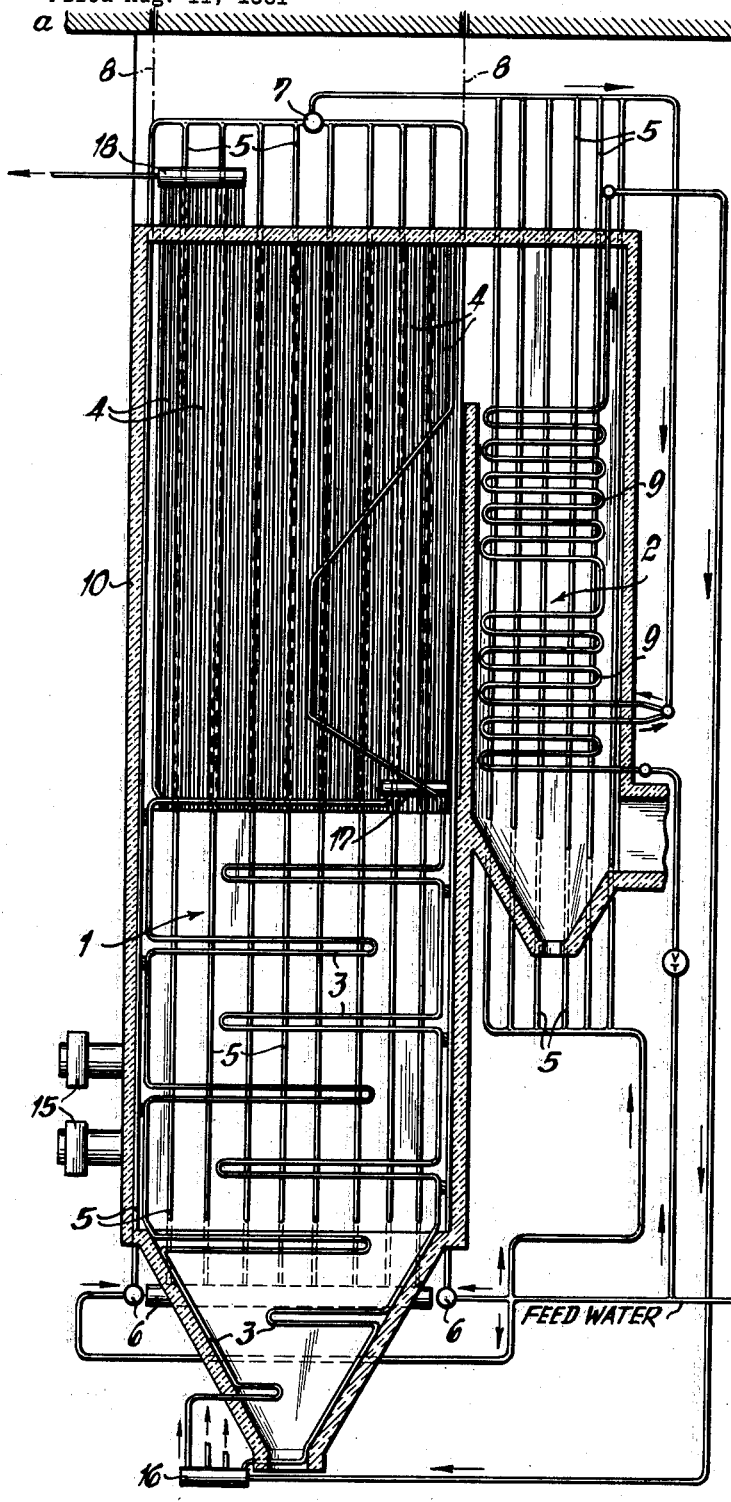
FIG. 8 is a vertical longitudinal section through a further embodiment of a boiler according to the present invention.

In FIGURE 8 the wall supporting tubes are also connected in parallel. In FIGURE 8, the feed water is split up as it leaves the main supply conduit into four flow paths, with a portion of the flow path passing into the supporting tubes for the drop flue and into the front and back supporting tubes for the fire box, and with a portion also going to the lower portion of the economizer. The upper end of the aforementioned supporting tubes and the upper end of the economizer are brought together by conduit means, and the feed water then passes to the main portion of the economizer and from there goes to the distributing chamber 16 of the boiler.

There may, of course, also be employed means for compensating any possible relative heat expansions in horizontal direction. Such heat expansion may occur, for instance due to the fact that the suspension pipes 5 similar to FIG. 1 are fixedly connected at the lower end with the relatively cool distributing chambers or collectors 6 and also shortly thereabove to the horizontally located coils of tube 3 at certain distances thereto. For this purpose, pipe expansion arches 22, 23 may be employed in the suspension tubes 5 (FIGS. 9 and 10).

Figure 4:
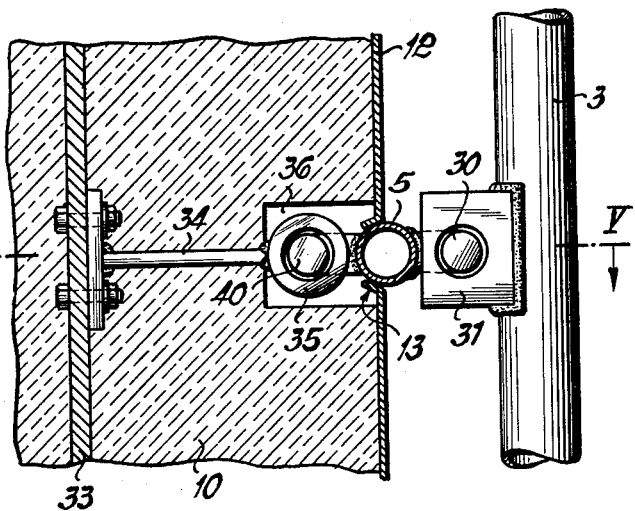
FIG. 4 shows in detail the connection between the supporting tubes and horizontally located wall cooling tubes of FIG. 2.
Figure 5:
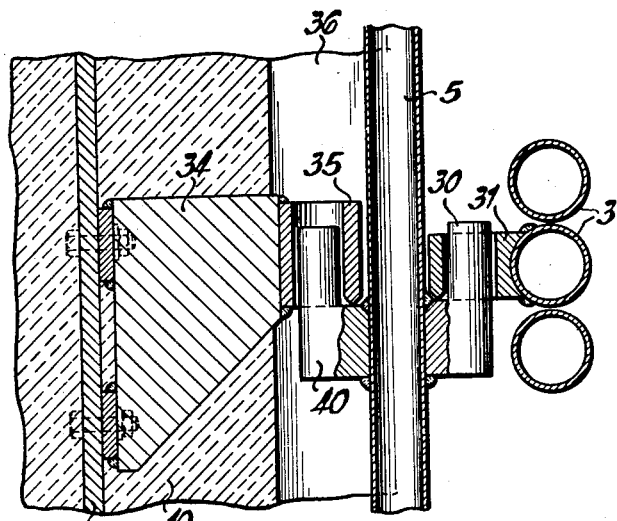
FIG. 5 is a section taken along the line V—V of FIG. 4.

FIGS. 4, 5 and 6, 7 respectively illustrate the suspension of the wall cooling tubes 3 and 4 at the supporting tubes 5. Referring first to FIGS. 4 and 5, hooks 30, 40 are connected to the supporting tubes 5 by welding while holding means 31 are provided at the cooling tubes 3. These holding means 31 are provided with bores and slipped over hooks 30. The arrangement shown in FIGS. 4 and 5 furthermore comprises plates 33 anchored in the insulating layer 10. Plates 33 have connected thereto brackets 34 provided with bushings 35 slipped over the hooks 40. Thus, the tubes 5 support on one side the insulating layer 10 by means of the hooks 40 and on the other side the tubes 3 through the intervention of the hook 30. Layer 10 is provided with recesses 36 in order to permit relative movement between the tubes 5 and the layer 10 which may occur due to non-uniform heat expansion.

Figure 6:
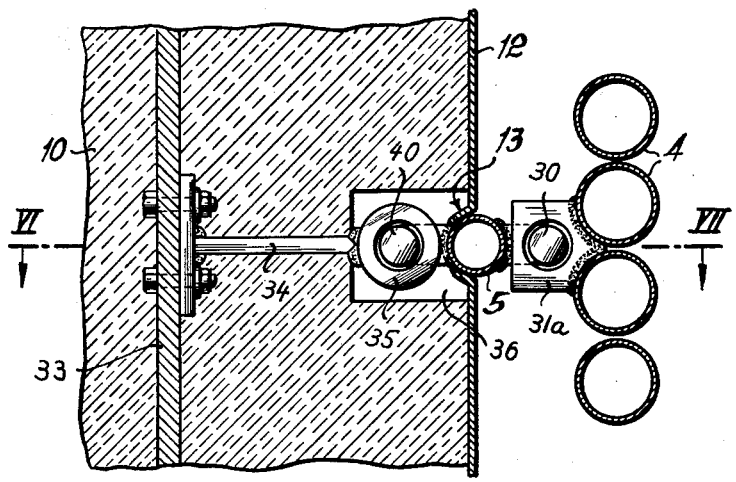
FIG. 6 shows in detail the connection between the supporting tubes and vertically arranged wall cooling tubes of FIG. 3.
Figure 7:
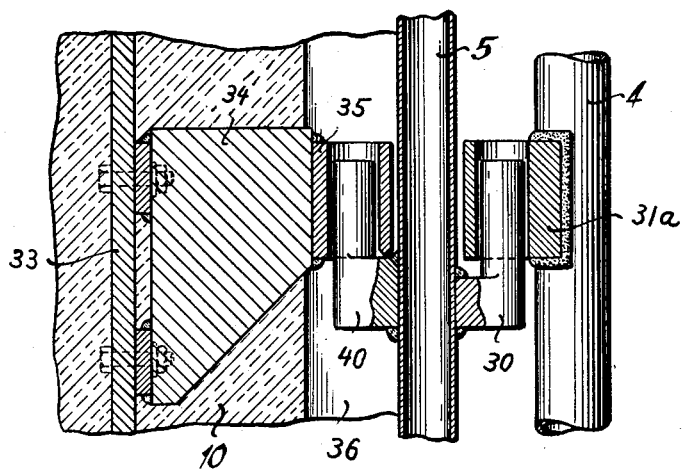
FIG. 7 is a section taken along the line VII—VII of FIG. 6.

In a similar manner, the tubes 4 are connected to the supporting tubes 5 as illustrated in FIGS. 6 and 7.

It is, of course, to be understood that the present invention is, by no means, limited to the particular construction shown in the drawing but also comprises any modifications within the scope of the appended claims.

What I claim is:

1. In a boiler assembly, a steam producing boiler including vertical walls enclosing a fire box, steam producing pipes substantially lining the vertical walls of said fire box, stationary supporting means above said boiler, a plurality of suspension tubes suspended from said supporting means and extending vertically between said walls and said steam producing pipes and having supporting means to support said walls and pipes on said suspension tubes, said vertical walls having recesses in their inner surfaces receiving said suspension tubes so that said pipes and said walls substantially shield said suspension tubes from heat radiation within the fire box, and connection means providing passage of fluid through said suspension tubes so that said tubes may be maintained at a temperature substantially below that of said steam producing pipes and said pipes are exposed to higher temperatures of said fire box radiation to raise fluid therein to steam producing temperature.

2. The structure claimed in claim 1, in which the connection means has an inlet connection to said tubes for water to enter said suspension tubes and an outlet connected to feed water to said steam producing pipes, so that the water passes through said tubes before being heated in said steam producing pipes.

References Cited by the Examiner
UNITED STATES PATENTS

| | | | |
|---|---|---|---|
| 1,886,214 | 11/32 | Murray | 122—235 |
| 1,922,599 | 8/33 | Murray | 122—510 |
| 2,308,762 | 1/43 | Krug et al. | 122—510 |
| 2,959,158 | 11/60 | Sprague | 122—494 |
| 2,986,139 | 5/61 | Nickel et al. | 122—235 |
| 2,999,483 | 9/61 | Armacost | 122—510 |

FOREIGN PATENTS

| | | |
|---|---|---|
| 1,207,894 | 9/59 | France. |

ROBERT A. O'LEARY, *Primary Examiner.*

FREDERICK L. MATTESON, JR.,
PERCY L. PATRICK, *Examiners.*